(12) United States Patent
Hartnagel et al.

(10) Patent No.: US 12,104,492 B1
(45) Date of Patent: Oct. 1, 2024

(54) TURBINE ASSEMBLY WITH CLEARANCE SENSOR HAVING INTEGRATED INTERNAL COOLING

(71) Applicant: Rolls-Royce North American Technologies Inc., Indianapolis, IN (US)

(72) Inventors: Brett Hartnagel, Indianapolis, IN (US); Brandon R. Snyder, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/372,438

(22) Filed: Sep. 25, 2023

(51) Int. Cl.
 *F01D 11/24* (2006.01)
 *F01D 17/02* (2006.01)
 *G01B 21/16* (2006.01)

(52) U.S. Cl.
 CPC .............. *F01D 11/24* (2013.01); *F01D 17/02* (2013.01); *G01B 21/16* (2013.01); *F05D 2220/32* (2013.01); *F05D 2240/55* (2013.01); *F05D 2260/20* (2013.01); *F05D 2260/80* (2013.01)

(58) Field of Classification Search
 CPC .................................. F01D 11/24; F01D 11/14
 See application file for complete search history.

(56) References Cited

U.S. PATENT DOCUMENTS

| | | | |
|---|---|---|---|
| 6,401,460 B1 * | 6/2002 | Xia | F01D 11/24 415/176 |
| 6,487,491 B1 * | 11/2002 | Karpman | G05B 17/02 415/117 |
| 7,207,769 B2 | 4/2007 | Tanioka | |
| 7,540,704 B2 | 6/2009 | Shang | |
| 7,922,441 B2 | 4/2011 | Shang | |
| 8,256,228 B2 * | 9/2012 | O'Leary | F01D 11/22 60/806 |
| 8,322,973 B2 | 12/2012 | Shang | |
| 8,773,115 B2 | 7/2014 | Phillips et al. | |
| 8,773,155 B2 | 7/2014 | Yang | |
| 8,827,630 B2 | 9/2014 | Shang | |
| 8,894,358 B2 * | 11/2014 | Bacic | F01D 11/20 415/173.2 |
| 9,266,618 B2 * | 2/2016 | Tillman | B64D 31/06 |
| 10,066,630 B2 * | 9/2018 | Kumar | F02C 3/04 |
| 10,393,149 B2 | 8/2019 | Mondal | |
| 10,612,466 B2 * | 4/2020 | Eastwood | B64D 33/02 |
| 10,760,444 B2 * | 9/2020 | Terwilliger | F01D 11/24 |
| 10,927,696 B2 * | 2/2021 | Eckett | F01D 11/24 |
| 11,028,722 B2 * | 6/2021 | Freeman | F01D 11/24 |
| 11,293,298 B2 * | 4/2022 | DiBenedetto | F01D 11/24 |
| 2014/0064924 A1 | 3/2014 | Warren | |
| 2023/0407758 A1 * | 12/2023 | Sharma | F01D 11/24 |

OTHER PUBLICATIONS

Yu et al., A review of blade tip clearance-measuring technologies for gas turbine engines, Measurement and Control, Mar. 2020, vol. 53(3-4) 339-357.

* cited by examiner

*Primary Examiner* — Sabbir Hasan
(74) *Attorney, Agent, or Firm* — Barnes & Thornburg LLP

(57) ABSTRACT

A turbine assembly includes a bladed rotor mounted for rotation about an axis of the gas turbine engine, a case assembly, and an internally-cooled tip clearance system. The internally-cooled tip clearance system includes a sensor is configured to monitor a tip clearance formed between the bladed rotor and the case assembly during operation of the gas turbine engine.

20 Claims, 3 Drawing Sheets

TURBINE ASSEMBLY WITH CLEARANCE SENSOR HAVING INTEGRATED INTERNAL COOLING

FIELD OF THE DISCLOSURE

The present disclosure relates generally to gas turbine engines, and more specifically to rotor tip gap systems.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine.

Compressors and turbines typically include alternating stages of static vane assemblies and rotating wheel assemblies. The rotating wheel assemblies include disks carrying blades around their outer edges. When the rotating wheel assemblies turn, tips of the blades which may incorporate a shroud move in close proximity to blade tracks that are attached to, or incorporated into the inner diameter of the turbine case arranged around the rotating wheel assemblies.

During operation, the tips of the blades included in the rotating wheel assemblies move inwardly and outwardly relative to a centerline of the engine due to changes in centrifugal force and temperatures experienced by the blades and the wheel. Similarly, the case and blade tracks may also move inwardly and outwardly relative to a center axis of the gas turbine engine due to changes in temperature during engine operation. Because of this movement inwardly and outwardly relative to the centerline, the case around the blades may be designed to minimize clearance between the blade tips and the blade tracks. This clearance may allow combustion products to pass over the blade tips without pushing the blades, thereby contributing to lost performance within a gas turbine engine.

SUMMARY

The present disclosure may comprise one or more of the following features and combinations thereof.

A turbine assembly adapted for use in a gas turbine engine may include a bladed rotor, an inner case, and a tip clearance system. The bladed rotor may be mounted for rotation about an axis of the gas turbine engine. The inner case may extend circumferentially around the bladed rotor to define an outer boundary of a gas path of the turbine assembly to block combustion products from moving through the gas path of the turbine assembly without interaction with blades on the bladed rotor. The tip clearance system may include a tip clearance sensor located radially outward of the inner case to engage the inner case radially outward of the gas path of the turbine assembly. The tip clearance sensor may be configured to monitor a tip clearance formed between the bladed rotor and the inner case during operation of the gas turbine engine.

In some embodiments, the tip clearance sensor may include sensor components and a sensor housing shaped to define an inner chamber that receives the sensor components. The sensor house may also be shaped to define a cooling passageway that extends around the inner chamber so that a portion of the cooling passageway is located radially between the sensor components and the inner case to create a gap radially between the sensor components and the inner case.

In some embodiments, the gap may provide thermal insulation between the sensor components and the inner case. The gap may conduct a flow of cooling air at a temperature lower than a temperature of the combustion products through the sensor housing to transfer heat from the tip clearance sensor to the flow of cooling air so as to cool the tip clearance sensor during operation of the gas turbine engine.

In some embodiments, the internally-cooled tip clearance system may further include a cooling air source in fluid communication with the cooling passageway formed in the tip clearance sensor. The cooling air source may supply the flow of cooling air to the cooling passageway.

In some embodiments, the sensor housing may further include a plurality of protrusions that extend into the cooling passageway. The plurality of protrusions may be configured to induce turbulence in the flow of cooling air supplied to the cooling passageway during operation of the gas turbine engine such that heat is more effectively transferred from the tip clearance sensor to the flow of cooling air.

In some embodiments, the cooling passageway may have an inlet radial section that extends radially inward toward the inner case from an inlet opening, a interconnecting section that extends axially from the inlet radial section, and an outlet radially section that extends radially outward from the interconnecting section to an outlet opening. The interconnecting section of the cooling passageway may define the portion of the cooling passageway located radially between the sensor components and the inner case to create the gap between the sensor components and the inner case. The plurality of protrusions may be located in one of the inlet radial section, the interconnecting section, and the outlet radially section of the cooling passageway.

In some embodiments, the plurality of protrusions may be only located in the interconnecting section of the cooling passageway formed in the sensor housing. In some embodiments, the plurality of protrusions may be located in the inlet radial section, the interconnecting section, and the outlet radially section of the cooling passageway formed in the sensor housing.

In some embodiments, the sensor housing of the tip clearance sensor may define a radially-inwardly facing surface. The radially-inwardly facing surface may directly engage a radially-outwardly facing surface of the inner case.

In some embodiments, the cooling passageway may have an inlet radial section that extends radially inward toward the inner case from an inlet opening, a interconnecting section that extends axially from the inlet radial section, and an outlet radially section that extends radially outward from the interconnecting section to an outlet opening. The interconnecting section of the cooling passageway may define the portion of the cooling passageway located radially between the sensor components and the inner case to create the gap between the sensor components and the inner case.

In some embodiments, the sensor housing may include a thermal barrier coating layer. The thermal barrier coating layer may define the radially-inwardly facing surface of the sensor housing.

In some embodiments, the turbine assembly may further include an outer case. The outer case may extend circumferentially around the inner case. The outer case may be spaced radially outward of the inner case to define an annular plenum therebetween. The cooling passageway may not be in fluid communication with the annular plenum.

According to another aspect of the present disclosure, a gas turbine engine may include a compressor configured to compress air drawn in to the gas turbine engine and discharge pressurized air, a combustor configured to mix fuel with the pressurized air from the compressor and ignites the fuel to produce hot, high pressure combustion products, and a turbine assembly configured to receive the combustion products and to extract mechanical work form the combustion products as the combustion products move through the turbine assembly. The turbine assembly may include a bladed rotor mounted for rotation about an axis of the gas turbine engine, an inner case that extends circumferentially around the bladed rotor, and a tip clearance system.

In some embodiments, the tip clearance system may include a tip clearance sensor located radially outward of the inner case to engage the inner case and a cooling air source in fluid communication with a cooling passageway formed in the tip clearance sensor to supply a flow of cooling air to the cooling passageway to transfer heat from the tip clearance sensor to the flow of cooling air. The tip clearance sensor may be configured to monitor a tip clearance formed between the bladed rotor and the inner case during operation of the gas turbine engine.

In some embodiments, the tip clearance sensor may include a sensor housing and sensor components. The sensor housing may be shaped to define an inner chamber and the cooling passageway that extends around the inner chamber. The sensor components may be located in the inner chamber so that a portion of the cooling passageway is located radially between the sensor components and the inner case to create a gap between the sensor components and the inner case.

In some embodiments, the sensor housing may further include a plurality of protrusions that extend into the cooling passageway. The plurality of protrusions may be configured to induce turbulence in the flow of cooling air supplied to the cooling passageway during operation of the gas turbine engine such that heat is more effectively transferred from the tip clearance sensor to the flow of cooling air.

In some embodiments, the cooling passageway may have an inlet radial section that extends radially inward toward the inner case from an inlet opening, a interconnecting section that extends axially from the inlet radial section, and an outlet radially section that extends radially outward from the interconnecting section to an outlet opening. The interconnecting section of the cooling passageway may define the portion of the cooling passageway located radially between the sensor components and the inner case to create the gap between the sensor components and the inner case. The plurality of protrusions may be located in one of the inlet radial section, the interconnecting section, and the outlet radially section of the cooling passageway.

In some embodiments, the plurality of protrusions may be only located in the interconnecting section of the cooling passageway formed in the sensor housing. In some embodiments, the plurality of protrusions may be located in the inlet radial section, the interconnecting section, and the outlet radially section of the cooling passageway formed in the sensor housing.

In some embodiments, the sensor housing of the tip clearance sensor may define a radially-inwardly facing surface. The radially-inwardly facing surface may directly engage a radially-outwardly facing surface of the inner case.

In some embodiments, the sensor housing may include a thermal barrier coating layer. The thermal barrier coating layer may define the radially-inwardly facing surface of the sensor housing.

In some embodiments, the turbine assembly may further include an outer case that extends circumferentially around the inner case. The outer case may be spaced radially outward of the inner case to define an annular plenum therebetween. The cooling passageway may not be in fluid communication with the annular plenum.

In some embodiments, the cooling air source may be air from the compressor. In some embodiments, the cooling air source is external to the gas turbine engine and may be one of a blower, a nacelle, or an air scoop.

These and other features of the present disclosure will become more apparent from the following description of the illustrative embodiments.

DETAILED DESCRIPTION OF THE DRAWINGS

Figure 1:
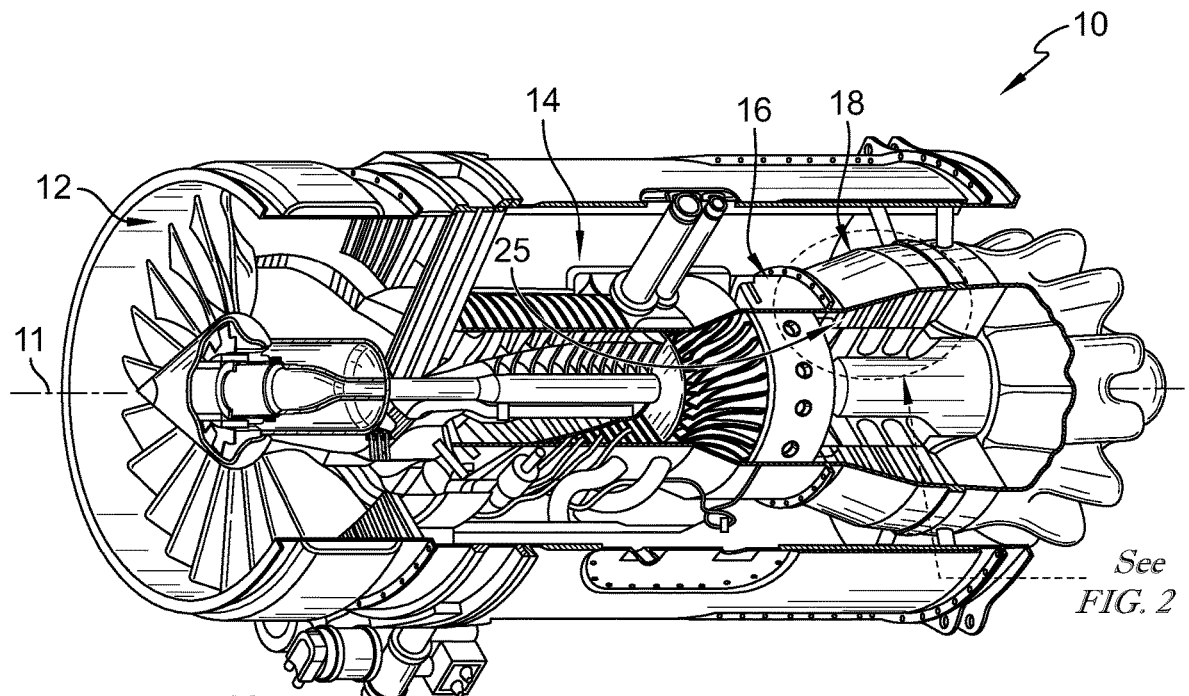
FIG. 1 is a cutaway perspective view of a gas turbine engine that includes a fan, a compressor, a combustor, and a turbine, the turbine including a turbine section comprising a plurality of bladed rotor assemblies configured to rotate about a central axis of the gas turbine engine and a plurality of static vane assemblies in between each bladed rotor assembly.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
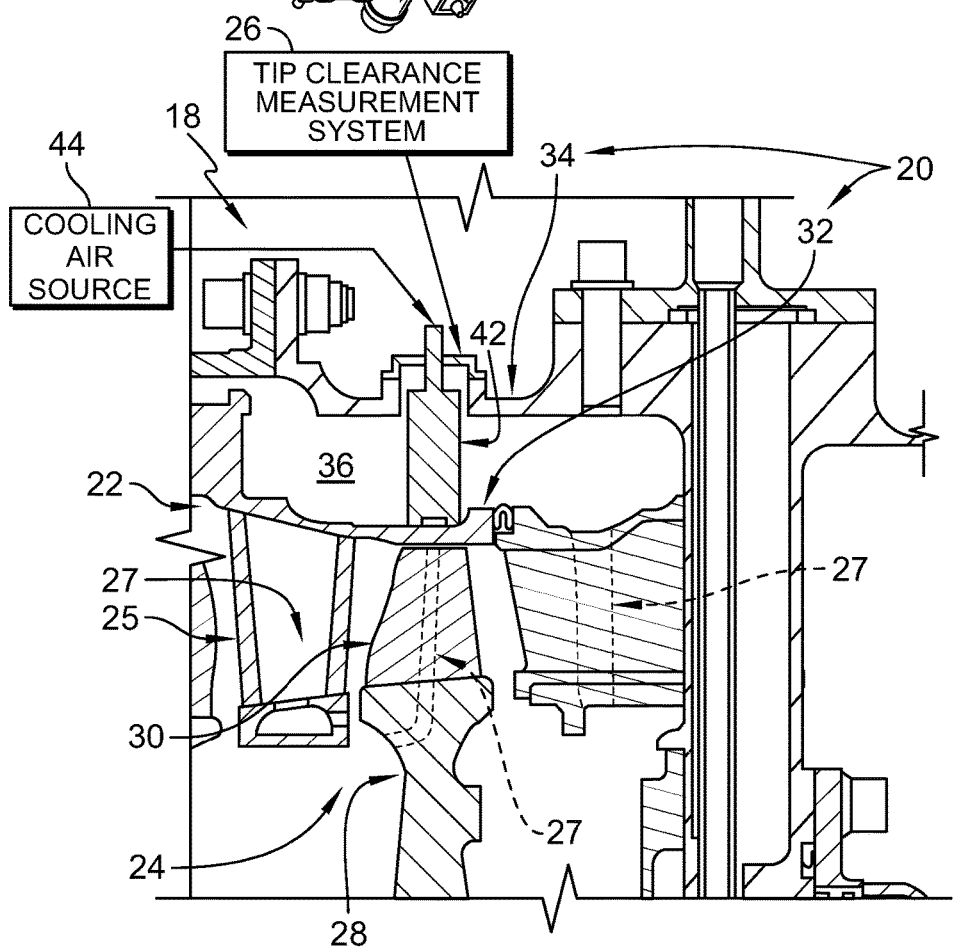
FIG. 2 is a cross-sectional view of a portion of the turbine section of the gas turbine engine of FIG. 1 showing the turbine section further includes a case assembly having an inner case that extends circumferentially around the bladed rotor assemblies and static vanes assemblies to define an outer boundary of a gas path of the gas turbine engine and an outer case that extends circumferentially around the inner case radially outward of the inner case and an internally-cooled tip clearance system configured to monitor the blade tip clearance between the bladed rotor and the case assembly.

The turbine 18 includes a case assembly 20, static turbine vane assemblies 22, rotating bladed rotor assemblies 24 between adjacent turbine vane assemblies 22, and an internally-cooled tip clearance system 26 as shown in FIG. 2. The case assembly 20 extends circumferentially around the axis 11 of the gas turbine engine 10. Each bladed rotor assembly 24 has a rotor 28 mounted for rotation about the axis 11 of the gas turbine engine 10 and a plurality of blades 30 coupled to the rotor 28 for rotation therewith. The internally-cooled tip clearance system 26 is configured to monitor the blade tip clearance T as shown in FIG. 3 between the bladed rotor 24 and the case assembly 20.

Figure 3:
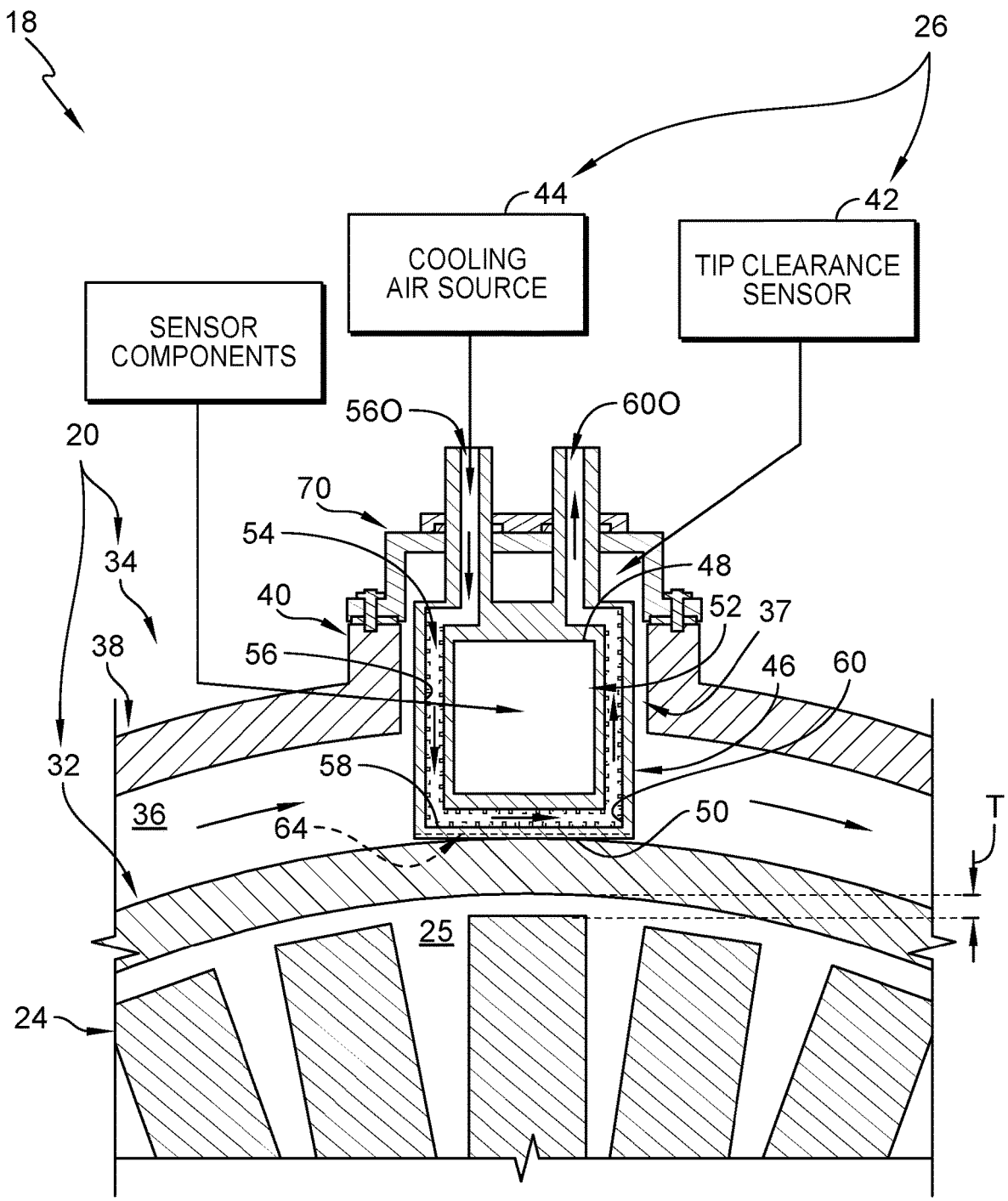
FIG. 3 is a cross-section view of the turbine section of FIG. 2 showing the internally-cooled tip clearance system includes a tip clearance sensor located in the annular plenum to engage the inner case and a cooling air source in fluid communication with a cooling passageway formed in the tip clearance sensor to supply a flow of cooling air to the cooling passageway to transfer heat from the tip clearance sensor to the flow of cooling air so as to cool the tip clearance sensor during operation of the gas turbine engine, and further showing the sensor includes a sensor housing shaped to define an inner chamber that houses the sensor components of the sensor and the cooling passageway that extends around the inner chamber so that a portion of the cooling passageway is located radially between the sensor components and the inner case to create a gap between the sensor components and the inner case that provides thermal insulation between the sensor components and the inner case.

The case assembly 20 includes an inner case 32 and an outer case 34 as shown in FIGS. 2 and 3. The inner case 32 extends circumferentially around the bladed rotor 24 to define an outer boundary of a gas path 25 of the turbine assembly 18. The inner case 32 extends circumferentially around the bladed rotor 24 to block combustion products from moving through the gas path 25 of the turbine assembly 18 without interaction with the blades 30 on the bladed rotor 24. The outer case 34 extends circumferentially around the inner case 32 radially outward of the inner case 32. The outer case 34 is spaced radially outward of the inner case 32 to define an annular plenum 36 therebetween.

The internally-cooled tip clearance system 26 includes a tip clearance sensor 42 and a cooling air source 44 as shown in FIGS. 2 and 3. The tip clearance sensor 42 is located in the annular plenum 36 radially outward of the inner case 32 to engage the inner case 32 radially outward of the gas path 25 of the turbine assembly 18. The cooling air source 44 is in fluid communication with a cooling passageway 54 formed in the tip clearance sensor 42 to supply a flow of cooling air to the cooling passageway 54 to transfer heat from the tip clearance sensor 42 to the flow of cooling air so as to cool the tip clearance sensor 42 during operation of the gas turbine engine 10.

Figure 4:
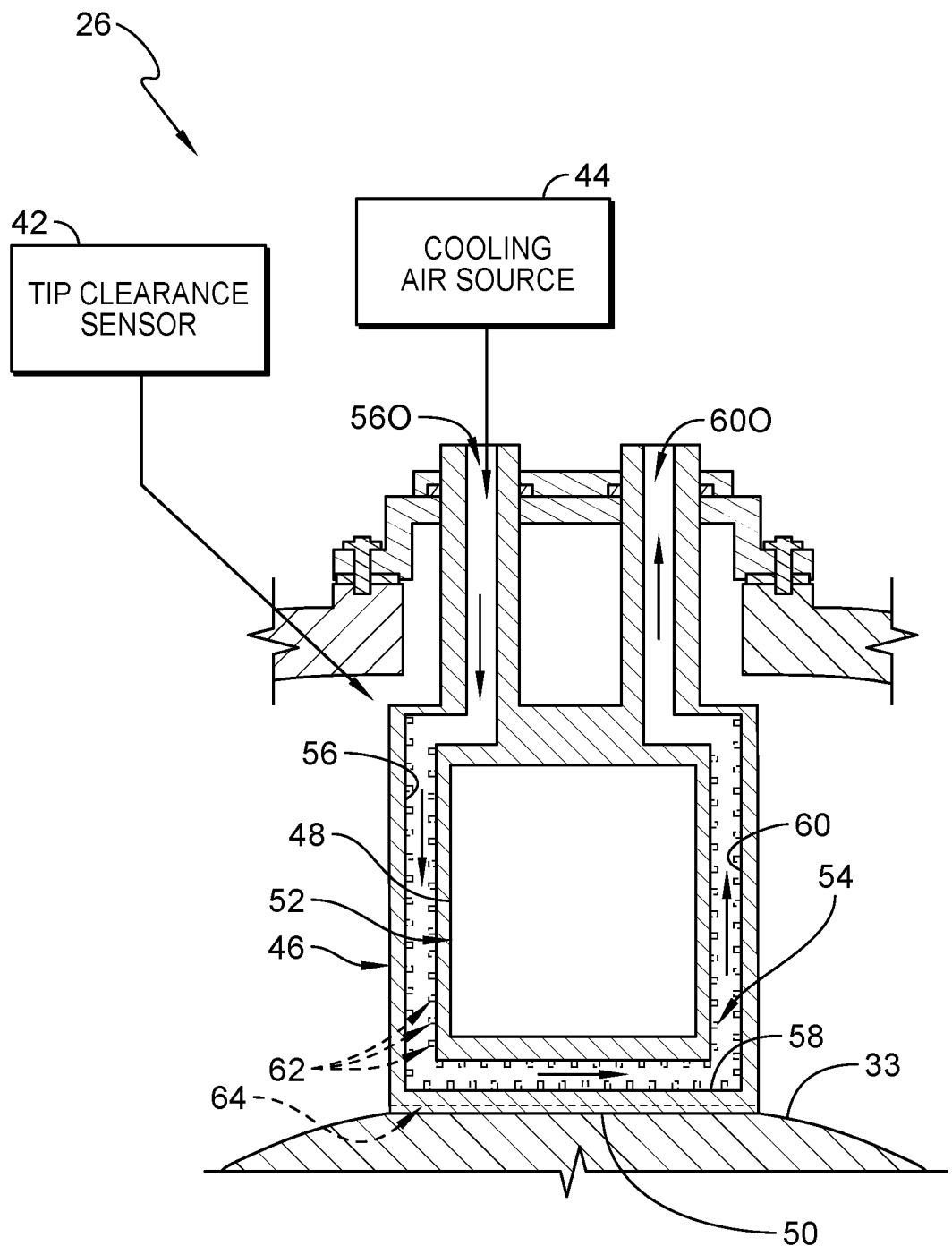
FIG. 4 is a detail view of FIG. 3 showing the sensor housing of the tip clearance sensor may further include a plurality of protrusions that extend into the cooling passageway to induce turbulence in the flow of cooling air supplied to the cooling passageway during operation of the gas turbine engine such that heat is more effectively transferred from the tip clearance sensor to the flow of cooling air.

The tip clearance sensor 42 includes a sensor housing 46 and other sensor components 48 as shown in FIGS. 3 and 4. The sensor housing 46 is shaped to define an inner chamber 52 and the cooling passageway 54 that extends around the inner chamber 52. The sensor components 48 are located in the inner chamber 52 so that a portion of the cooling passageway 54 is located radially between the sensor components 48 and the inner case 32. In this way, the cooling passageway 54 creates a gap between the sensor components 48 and the inner case 32 that provides thermal insulation between the sensor components 48 and the inner case 32.

The distance between the tips of the blades included in the bladed rotor 24 and the surrounding case may be important to gas turbine engine performance. Sensors 42 may be used to monitor the tip clearance T during engine operation. Sensors 42 may also be incorporated into a control system which may measure and adjust the turbine tip clearance T for optimum performance.

The sensor 42 is configured to monitor a tip clearance T formed between the bladed rotor 24 and the inner case 32 during operation of the gas turbine engine 10. To provide an accurate measurement, the sensor 42 needs to remain in contact with an inner case 32 of the case assembly 20, which carries the blade track. Temperatures in this region of the engine 10 may exceed the capability of electronic or magnetic sensor components; therefore, the sensor 42 may need to be cooled.

Therefore, the sensor housing 46 includes the cooling passageway 54 as shown in FIGS. 3 and 4. As a radially-inwardly facing surface 50 of the sensor housing 46 contacts the inner case 32, the cooling passageway 54 extends through the sensor housing 46 radially between the sensor components 48 and the inner case 32. The cooling passageway 54 extends through the sensor housing 46 so that a gap is formed between the sensor components 48 and the inner case 32 to provide thermal insulation between the sensor components 48 and the inner case 32. The flow of cooling air provided from the cooling air source 44 helps to cool the sensor 42.

The cooling passageway 54 has an inlet radial section 56, an interconnecting section 58, and an outlet radial section 60 as shown in FIGS. 3 and 4. The inlet radial section 56 extends radially inward toward the inner case 32 from an inlet opening 560. The interconnecting section 58 extends axially from the inlet radial section 56. The outlet radial section 60 extends radially outward from the interconnecting section 58 to an outlet opening 600.

The interconnecting section 58 of the cooling passageway 54 defines the portion of the cooling passageway 54 located radially between the sensor components 48 and the inner case 32 as shown in FIGS. 3 and 4. The interconnecting section 58 creates the gap between the sensor components 48 and the inner case 32.

In some embodiments, the sensor housing 46 includes more than one cooling passageway 54. In some embodiments, the plurality of cooling passageways 54 are in fluid communication with each other.

In the illustrative embodiment, the sensor housing 46 further includes heat transfer features 62 as suggested in FIG. 4. The heat transfer features 62 are a plurality of protrusions 62 in the illustrative embodiment. The plurality of protrusions 62 may be dimples, fins, pins, or other similar features to increase the efficiency of the heat transfer.

The plurality of protrusions 62 extend into the cooling passageway 54. The plurality of protrusions 62 are configured to induce turbulence in the flow of cooling air supplied to the cooling passageway 54 during operation of the gas turbine engine 10. In this way, the heat is more effectively transferred from the tip clearance sensor 42 to the flow of cooling air.

In the illustrative embodiment, the plurality of protrusions 62 are located in one of the inlet radial section 56, the interconnecting section 58, and the outlet radial section 60 of the cooling passageway 54 as suggested in FIG. 4. In some embodiments, the plurality of protrusions 62 are located in only part of the inlet radial section 56, the interconnecting section 58, and/or the outlet radial section 60 of the cooling passageway 54.

In some embodiments, the plurality of protrusions 62 are only located in the interconnecting section 58 of the cooling passageway 54 formed in the sensor housing 46. In the illustrative embodiment, the plurality of protrusions 62 are located in the inlet radial section 56, the interconnecting section 58, and the outlet radial section 60 of the cooling passageway 54 formed in the sensor housing 46.

In the illustrative embodiment, the radially-inwardly facing surface 50 of the sensor housing 46 directly engages the inner case 32. The radially-inwardly facing surface 50 abuts the radially-outwardly facing surface 33 of the inner case 32.

In some embodiments, the sensor housing 46 may include a thermal barrier coating layer 64 as suggested in FIG. 3. The thermal barrier coating layer 64 may define the radially-inwardly facing surface 50 of the sensor housing 46.

Turning back to the turbine section 18, cooling air may be taken from the compressor 14 prior to discharge into the combustor 16 and delivered to the turbine 18 to cool the components in the turbine section 18. The flow of cooling air may flow through cooling passageways in the turbine vanes 22 and/or the bladed rotor assembly 24 to cool the components of the turbine 18 as shown in FIG. 2. The compressed air from the compressor 14 is cooler and at a higher presser than the air flowing through the gas path 25 of the turbine section 18.

Cooling air from the compressor 14 may flow from the annular plenum 36 through cooling passageways 27 as shown in FIG. 2. Additionally, the cooling air may flow radially inward through the turbine vanes 22 and then radially outward through the bladed rotor 24 toward the inner case 32 of the case assembly 20. However, the cooling passageway 54 is not in fluid communication with the annular plenum 36.

In the illustrative embodiment, the cooling air source 44 is different from the cooling air source used to deliver cooling air to the other components of the turbine 18. The cooling air source 44 may be cooling air taken from an earlier compressor stage near the axially forward end of the compressor 14. In some embodiments, the cooling air source 44 may instead be a nacelle flow or from a source external to the engine such as a blower, an air scoop, etc.

In other embodiments, the cooling air source 44 may be the same as the cooling air source used for other components of the turbine 18. For example, the cooling air source 44 may be the cooling air taken from the compressor 14 prior to discharge into the combustor 16. The cooling air from the cooling air source 44 may flow to the cooling passageway 54 as well as the annular plenum 36.

Turning again to the case assembly 20, the outer case 34 includes an outer case wall 38 and an outer case boss 40 as shown in FIG. 3. The outer case wall 38 extends circumferentially at least partway about the axis 11. The outer case boss 40 extends radially outward from the outer case wall 38.

In the illustrative embodiment, an opening 37 extends radially through the outer case wall 38 and the outer case boss 40 and is open to the annular plenum 36. The sensor 42 extends into the opening 37 in the illustrative embodiment.

In the illustrative embodiment, the internally-cooled tip clearance system includes a sensor mount 70 that couples to the outer case 34 to close the opening 37. The sensor 42 extends through the sensor mount 70 in the illustrative embodiment.

A method of monitoring and controlling the tip clearance during engine operation may include several steps. The method includes using the tip clearance sensor 42 to monitor the tip clearance T formed between the blades 30 on the bladed rotor 24 and the inner case 32 during operation of the gas turbine engine 10. While monitoring the tip clearance, the method further includes conducting the flow of cooling air into the cooling passageway 54 from the cooling air source 44 to transfer heat from the sensor 42 to the cooling air so as to cool the sensor 42 during operation of the gas turbine engine 10.

The present invention is a method to cool a tip clearance sensor 42 in a gas turbine engine 10. This invention may be used in either the compressor 14 or turbine 18 of the engine 10; however, the example embodiment discussed here is mounted in the turbine 18.

The blades 30 are typically arranged around the outer diameter of a rotor 28. Stages of one or more bladed discs may be coaxially assembled to form a rotor which rotates about the axis 11. The bladed rotor 24 is housed with a static structure which may include an inner case 32 and an outer case 34. The inner surface of the static structure which is immediately adjacent to the tips of the blades 30 and surrounds the bladed rotor 24 may be referred to as the blade track. The blade track may be part of a separate component that attaches to the inner case 32, or it may be integral to the inner case 32 itself.

The radial distance between the tips of the blades 30 and the surrounding blade track 32 is the tip clearance T, which may be important to gas turbine engine performance. Sensors 42 may be used to monitor the tip clearance T during engine operation and may also be incorporated into a control system which can measure and adjust the turbine tip clearance T for optimum performance.

To provide an accurate measurement, the sensor 42 needs to be contact with the inner case 32, which carries the blade track. Temperatures in this region of the engine 10 may exceed the capability of electronic or magnetic sensor components. Therefore, the sensor 42 may need to be cooled.

The sensor housing 46 is formed to include cooling passageways 54 surrounding the inner chamber 52 that contains the tip clearance sensor components 48. The cooling passageways 54 create an air gap between the inner chamber 52 and the outer wall of the sensor housing 46, which is exposed to hot air and contacts hot surfaces, like the inner case 32, in the turbine section 18 of the engine 10.

The air gap provides thermal insulation for the sensor 42. The cooling air source 44 may also provide a flow of cooling air through the cooling passageways 54 to extract heat from the sensor housing 46 to provide cooling. The cooling passageways 54 may be smooth or may incorporate heat transfer features 62 such as protrusions, pins, fins, dimples, turbulators, or other features to increase the efficiency of the heat transfer.

Additive machining, such as 3D printing or powder bed fusion may be used to manufacture the sensor housing 46 and incorporate the cooling passageways 54 and features 62. This cooling passageways 54 are not in fluid communication with the plenum 36 surrounding the sensor 42 or the gas path 25, which allows low pressure air to be used. This air may be provided from an early compressor stage, nacelle flow, or from a source external to the engine such as a blower, an air scoop, etc.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine, the turbine assembly comprising
a bladed rotor mounted for rotation about an axis of the gas turbine engine, an inner case that extends circumferentially around the bladed rotor to define an outer boundary of a gas path of the turbine assembly to block combustion products from moving through the gas path of the turbine assembly without interaction with blades on the bladed rotor, and a tip clearance system including a tip clearance sensor located radially outward of the inner case to engage the inner case radially outward of the gas path of the turbine assembly and configured to monitor a tip clearance formed between the bladed rotor and the inner case during operation of the gas turbine engine, wherein the tip clearance sensor includes sensor components and a sensor housing shaped to define an inner chamber that receives the sensor components and a cooling passageway that extends around the inner chamber so that a portion of the cooling passageway is located radially between the sensor components and the inner case to create a gap radially between the sensor components and the inner case that provides thermal insulation between the sensor components and the inner case and conducts a flow of cooling air at a temperature lower than a temperature of the combustion products through the sensor housing to transfer heat from the tip clearance sensor to the flow of cooling air so as to cool the tip clearance sensor during operation of the gas turbine engine.

2. The turbine assembly of claim 1, wherein the internally-cooled tip clearance system further includes a cooling air source in fluid communication with the cooling passageway formed in the tip clearance sensor to supply the flow of cooling air to the cooling passageway.

3. The turbine assembly of claim 2, wherein the sensor housing further includes a plurality of protrusions that extend into the cooling passageway and configured to induce turbulence in the flow of cooling air supplied to the cooling passageway during operation of the gas turbine engine such that heat is more effectively transferred from the tip clearance sensor to the flow of cooling air.

4. The turbine assembly of claim 3, wherein the cooling passageway has an inlet radial section that extends radially inward toward the inner case from an inlet opening, an interconnecting section that extends axially from the inlet radial section, and an outlet radially section that extends radially outward from the interconnecting section to an outlet opening, the interconnecting section of the cooling passageway defines the portion of the cooling passageway located radially between the sensor components and the inner case to create the gap between the sensor components and the inner case, and the plurality of protrusions are located in one of the inlet radial section, the interconnecting section, and the outlet radially section of the cooling passageway.

5. The turbine assembly of claim 4, wherein the plurality of protrusions are only located in the interconnecting section of the cooling passageway formed in the sensor housing.

6. The turbine assembly of claim 4, wherein the plurality of protrusions are located in the inlet radial section, the interconnecting section, and the outlet radially section of the cooling passageway formed in the sensor housing.

7. The turbine assembly of claim 1, wherein the sensor housing of the tip clearance sensor defines a radially-inwardly facing surface that directly engages a radially-outwardly facing surface of the inner case.

8. The turbine assembly of claim 7, wherein the cooling passageway has an inlet radial section that extends radially inward toward the inner case from an inlet opening, a interconnecting section that extends axially from the inlet radial section, and an outlet radially section that extends radially outward from the interconnecting section to an outlet opening, the interconnecting section of the cooling passageway defines the portion of the cooling passageway located radially between the sensor components and the inner case to create the gap between the sensor components and the inner case.

9. The turbine assembly of claim 7, wherein the sensor housing includes a thermal barrier coating layer that defines the radially-inwardly facing surface of the sensor housing.

10. The turbine assembly of claim 1, further comprising an outer case that extends circumferentially around the inner case and is spaced radially outward of the inner case to define an annular plenum therebetween, and wherein the cooling passageway is not in fluid communication with the annular plenum.

11. A gas turbine engine comprising
a compressor configured to compress air drawn in to the gas turbine engine and discharge pressurized air,
a combustor configured to mix fuel with the pressurized air from the compressor and ignites the fuel to produce hot, high pressure combustion products,
a turbine assembly configured to receive the combustion products and to extract mechanical work form the combustion products as the combustion products move through the turbine assembly, the turbine assembly including
a bladed rotor mounted for rotation about an axis of the gas turbine engine,
an inner case that extends circumferentially around the bladed rotor, and
a tip clearance system including a tip clearance sensor located radially outward of the inner case to engage the inner case and configured to monitor a tip clearance formed between the bladed rotor and the inner case during operation of the gas turbine engine and a cooling air source in fluid communication with a cooling passageway formed in the tip clearance sensor to supply a flow of cooling air to the cooling passageway to transfer heat from the tip clearance sensor to the flow of cooling air,
wherein the tip clearance sensor includes a sensor housing shaped to define an inner chamber and the cooling passageway that extends around the inner chamber and sensor components located in the inner chamber so that a portion of the cooling passageway is located radially between the sensor components and the inner case to create a gap between the sensor components and the inner case.

12. The gas turbine engine of claim 11, wherein the sensor housing further includes a plurality of protrusions that extend into the cooling passageway and configured to induce turbulence in the flow of cooling air supplied to the cooling passageway during operation of the gas turbine engine such that heat is more effectively transferred from the tip clearance sensor to the flow of cooling air.

13. The gas turbine engine of claim 12, wherein the cooling passageway has an inlet radial section that extends radially inward toward the inner case from an inlet opening, an interconnecting section that extends axially from the inlet radial section, and an outlet radially section that extends radially outward from the interconnecting section to an outlet opening, the interconnecting section of the cooling passageway defines the portion of the cooling passageway located radially between the sensor components and the inner case to create the gap between the sensor components and the inner case, and the plurality of protrusions are located in one of the inlet radial section, the interconnecting section, and the outlet radially section of the cooling passageway.

14. The gas turbine engine of claim 13, wherein the plurality of protrusions are only located in the interconnecting section of the cooling passageway formed in the sensor housing.

15. The gas turbine engine of claim 13, wherein the plurality of protrusions are located in the inlet radial section, the interconnecting section, and the outlet radially section of the cooling passageway formed in the sensor housing.

16. The gas turbine engine of claim 11, wherein the sensor housing of the tip clearance sensor defines a radially-inwardly facing surface that directly engages a radially-outwardly facing surface of the inner case.

17. The gas turbine engine of claim 16, wherein the sensor housing includes a thermal barrier coating layer that defines the radially-inwardly facing surface of the sensor housing.

18. The gas turbine engine of claim 11, further comprising an outer case that extends circumferentially around the inner case and is spaced radially outward of the inner case to define an annular plenum therebetween, and wherein the cooling passageway is not in fluid communication with the annular plenum.

19. The gas turbine engine of claim 11, wherein the cooling air source is air from the compressor.

20. The gas turbine engine of claim 11, wherein the cooling air source is external to the gas turbine engine and may be one of a blower, a nacelle, or an air scoop.

* * * * *